United States Patent

[11] 3,630,328

[72] Inventor Roy A. Nelson
 Grand Prairie, Tex.
[21] Appl. No. 66,423
[22] Filed Aug. 24, 1970
[45] Patented Dec. 28, 1971
[73] Assignee LTV Aerospace Corporation
 Dallas, Tex.

[54] LINEAR ACTUATOR WITH BRAKING DEVICE
 11 Claims, 8 Drawing Figs.
[52] U.S. Cl. .................................................. 192/8 R,
 74/424.8 R
[51] Int. Cl. ................................................. B60t 7/14,
 F16h 1/16
[50] Field of Search ..................................... 192/8, 148;
 74/424.8 R

[56] References Cited
 UNITED STATES PATENTS

| | | | |
|---|---|---|---|
| 2,480,212 | 8/1949 | Baines | 192/8 R UX |
| 2,653,691 | 9/1953 | Weiland | 192/8 R |
| 2,969,222 | 1/1961 | Sears | 192/8 R X |
| 3,017,975 | 1/1962 | Kinser | 192/8 R |
| 3,269,199 | 8/1966 | Deehan et al. | 74/424.8 R X |

Primary Examiner—Allan D. Herrmann
Attorney—H. C. Goldwire

ABSTRACT: An actuator for connecting a reversible, rotary driving means to a load to be linearly moved and positioned thereby and employing a sleeve having a flange externally formed on one end portion thereof and having an external thread or the like on the opposite end portion. An internal thread or the like, directed oppositely to the external thread, is formed in the sleeve end portion having the external flange. The sleeve is coaxially positioned within and its external thread engaged with a generally cylindrical structure. A threaded shaft is coaxially positioned within and its thread engaged with the sleeve internal thread. Forces imposed on the sleeve and originating in torques imposed on the cylindrical structure or shaft urge the sleeve flange into braking contact with one or the other of a pair of annular members, each of which members is located at a respective side of the sleeve flange and is free to rotate only in a direction opposite to that in which the other of such members if free to rotate.

ROY A. NELSON
INVENTOR

BY *H C Baldwin*

ATTORNEY

ROY A. NELSON
INVENTOR
BY H.C. Goldwin
ATTORNEY 3,630,328

ROY A. NELSON
INVENTOR

BY H C Goldwire
ATTORNEY

LINEAR ACTUATOR WITH BRAKING DEVICE

This invention relates to clutches and power delivery controls of an actuator, and more particularly to transmission control and automatic braking of a ball-screw actuator, which control and braking is responsive to imposed driving-means torque to release incorporated brakes.

A positioning system may utilize various combinations of mechanisms to couple a rotary driving means to a load to be linearly moved and positioned thereby relative to a fixed structure. One mechanism often employed in such a positioning system is a braking and coupling mechanism. Such a mechanism is capable of acting not only as a directly driving coupling when the rotary driving means is operative, but is also capable of preventing torque-producing forces from the load to be moved and positioned from being transmitted back through the mechanism to the rotary driving means, thus preventing either overspeeding of the rotary driving means or overrunning of the desired load position, if the torque-producing force is in the same direction as the torque being produced by the rotary driving means. A braking and coupling mechanism is further capable of acting as a brake, when the rotary driving means is inoperative, to prevent torque-producing forces from the load from being transmitted through the mechanism to the idle rotary driving means and concurrently to lock the load to be moved and positioned in a set position.

A braking and coupling mechanism may be employed for direct coupling of a rotary driving means to a load to be positioned; generally, however, a braking-coupling mechanism is used in cooperation with an actuator which effects a gear reduction of the rotary speed of the rotary driving means and changes the rotary motion to linear motion. The mechanism, therefore, is generally located between the rotary driving means and an actuator.

A braking-coupling mechanism is not always utilized as a separate device and may be incorporated within an actuator. This has been frequently done, for example, in the aircraft industry where specially designed equipment is often made necessary because of critical weight and space limitations.

Most actuators incorporating a ball-screw device efficiently utilize, to position a load, an input torque provided by a rotary driving means; for little of the input torque is needed to overcome frictional forces between the balls and the screw. The driving means for ball-screw actuators, therefore, usually require one-third or less the power required for driving means of other types of actuators. Ball-screw actuators are utilized throughout industry, but are exceptionally attractive for actuation of control surfaces for airplanes because of the relatively smaller and, consequently, lighter-weight driving means that ball-screw actuators require.

A braking-coupling mechanism is especially desirable, if not essential, for use with or incorporation within a ball screw actuator, for the friction in most ball screw actuators is so low that a load-imposed force at the ball screw actuator output connection will tend to reverse or overspeed the ball screw actuator driving means.

Existing ball screw actuators which incorporate braking-coupling devices have numerous shortcomings, especially in applications where synchronization of multiple positioning systems is essential and the loads impose torque-producing forces on the actuator output connections that result in torques either in the same direction as the torque from the rotary driving means or in torques in the opposite direction. Existing ball screw actuators incorporating braking-coupling devices have further, undesirable characteristics in applications where weight and cost of the positioning systems are influencing factors, long operating life of the actuators is necessary, and reliable lockup, release, and positioning of the load to be moved and positioned are mandatory.

Actuators of one existing type incorporate a braking-coupling mechanism and work well enough when new but become unreliable with wear. Such actuators usually have the common feature of components (such as levers and ball-ramp devices) that move to apply a force to a brake; but the movement of these components is limited, with the result that, when they must move farther and farther to compensate for brake wear, they eventually reach their limit of movement, and slippage then occurs. Without adjustment or replacement of parts, more and more slippage occurs until little or no braking capability is left. Most existing braking-coupling actuators have no convenient method of adjustment for wear to prolong their service life. Adjustment in many types of such actuators entails partial disassembly for replacement of worn parts, the addition of shims, or the obtaining of access to adjusting screws.

Still other types of actuators incorporating braking-coupling devices require very close manufacturing tolerances which vastly increase the unit cost of each device and the probability of failure because of contamination typified by the introduction of metallic particles, generated from wear or during manufacturing, into clearances between moving parts. An actuator, requiring close manufacturing tolerances and containing components made of dissimilar metals having different coefficients of expansion, is said to be temperature sensitive if any differential thermal expansion could cause possible seizing or galling of components or could cause an increase in clearance that results in reduced braking power of the device. Temperature-sensitive actuators have, of course, restricted uses.

In other types of ball screw actuators incorporating braking-coupling mechanisms, there are intentionally incorporated clearances between connecting parts that result in looseness which makes difficult the synchronization of multiple positioning systems and the precise positioning of a load such as, for example, control surfaces of an airplane. "Looseness" refers herein to a condition permitting relative movement or play between two parts drivingly connected so that motion of one part relative to the other can occur. Limited back-motion of the driven member, therefore, can occur with respect to the driving member under some conditions. Looseness-producing clearances are necessary in many existing braking-coupling actuators which use arms or levers either to move and expand brake shoes or to move other components into and out of contact with friction surfaces; still other actuators contain intentionally provided gaps between the teeth of splines to delay movement of one shaft while, for example, drivingly connected slip-clutches can disengage brakes.

Still another type of braking-coupling actuator performs well when primarily subjected to opposing loads, but wears out rapidly under conditions resulting when an object to be moved by the actuator tends to be moved by other forces (e.g., airloads) in the same direction as that in which the actuator is attempting to move the object; such a load is usually referred to as an "aiding" load. Braking-coupling actuators that wear out rapidly under aiding loads inherently incorporate components which continually drag or rub rotating surfaces under an aiding-load condition. Some actuators require input torques from the rotary driving means that are larger than the input torques actually required merely for moving the load. This is true for actuators having one brake continuously acting in one rotative direction and another brake continuously acting in the other rotative direction; hence, the input torque must override a brake to move and position the load. As soon as the driving means is turned off and rendered inoperative, at least one brake immediately locks the load in position. Still other actuators incorporate continuously slipping clutches which consume and waste input torque from the rotary driving means, thereby lowering the efficiency of the positioning system.

Some other types of braking-coupling actuators require specific limitations, often necessarily maintained within close tolerances, on the maximum and minimum braking capacities of their brakes. Braking capacity may be defined in terms of percentage of input torque (e.g., 200 percent of the input torque). Braking capacity is controlled by coefficients of friction of the braking surfaces. Usually, then, particular braking-surface materials are used that will have the proper coefficients of friction. Experience, however, has shown that actuators of this type are very unreliable because wear, temperature, and contamination (introduction of foreign particles between braking surfaces) radically change or affect coefficients of friction. If a coefficient of friction becomes too low, the actuator employing such a braking-coupling device will not brake sufficiently to lock the load; and, if the coefficient of friction becomes too high, the release of the load is prevented, for the torque required to release the brake exceeds the torque capacity of the driving means. Another type of braking-coupling actuator incorporates a spring which applies a force to brake discs; but, should a load to be moved and positioned transmit a torque-producing force to the actuator which exceeds the constant spring-force applied to the brake discs, the actuator will permit load slippage. Great care must, therefore, be used in determining the maximum torques the load to be moved and positioned will transmit to the actuator to assure the selection of a spring that will supply an adequate force.

Still another type of braking-coupling actuator is not capable of small incremental adjustments of the position of the load. An actuator of this type usually incorporates a continuously operating brake that must be overpowered before positioning of the load can be effected. Alternatively, such an actuator utilizes a single, locking-spring clutch on its output connection, which clutch is unlocked by rotation of the input connection in either rotative direction, with the consequence that a change in the direction of the feedback torque from the load, while the load is being moved, could prevent braking. Braking-coupling actuators of other types have no mechanical brake-releases; thus, once the load is locked, a momentary overpowering of the brake is necessary to initiate the release. An actuator of this type may incorporate two rotatably mounted, annular braking components, one of which components is prevented from rotating in one direction and the other of which is prevented from rotating in the opposite direction. Rotation of the input or output connection of a mechanism of this type will cause an internal member of the mechanism to move and to come into contact with one of the annular braking components. Should contact be made with one of the annular braking components by the internal member while the internal member is tending to rotate in the direction in which the annular braking component cannot rotate, then braking and locking will occur. In order to break such contact with the surface of the annular braking component, however, a momentarily overpowering torque is required to initiate movement of the internal member.

Heretofore, some braking-coupling actuators could overcome some of the above-mentioned problems, but always at the expense of retaining one or more of the remaining shortcomings.

It is, accordingly, a major object of the present invention to provide a new and improved actuator incorporating a braking-coupling mechanism for connecting a reversible, rotary driving means to a load to be linearly moved and positioned thereby relative to a fixed structure.

Another object of the present invention is to provide a braking-coupling actuator with braking and locking capabilities substantially unaffected by wear, temperature, or contamination of braking surfaces of the actuator.

A further object is to provide, in such an actuator, a mechanical brake-releasing mechanism which eliminates the need of excessive torque to override and release the brake for permitting movement of the load, and which mechanism permits movement of the load in small, accurately controlled increments.

Yet another object is to provide a braking-coupling actuator having means for convenient, external adjustment for wear of braking surfaces.

A still further object is to provide a braking-coupling actuator that is as durable, reliable, and smooth in operation when positioning a load which acts in the aiding direction as it is when positioning a load which acts in the opposing direction with respect to the torque direction of the driving means.

Still another object is to provide a braking-coupling actuator not only without intentionally provided looseness, but without any looseness which is above the negligible and acceptable limits within which synchronization of multiple positioning systems and precise positioning of the load may be obtained.

An additional object is to provide such an actuator that is simple, compact, and free of the need of close manufacturing tolerances which would increase the unit cost of the actuator and increase the probability of failure occasioned by contamination or wear.

Another object is to eliminate the need, in the braking-coupling portion of an actuator, for closely controlled tolerances on coefficients of friction and maximum braking capacity, thereby obviating the problem of seizure and unreleasable locking occasioned by galling or undesired increase in maximum braking capacity on the one hand, or of loss of locking capability accompanying wear and a consequent reduction of braking capacity on the other.

A further object of this invention is to eliminate brake slippage in a braking-coupling actuator attributable to load-imposed forces.

A still further object is to provide such an actuator which does not excessively consume and waste input torque.

Other objects and advantages will be evident from the specification and claims and the accompanying drawing illustrative of the invention.

Figure 1A:
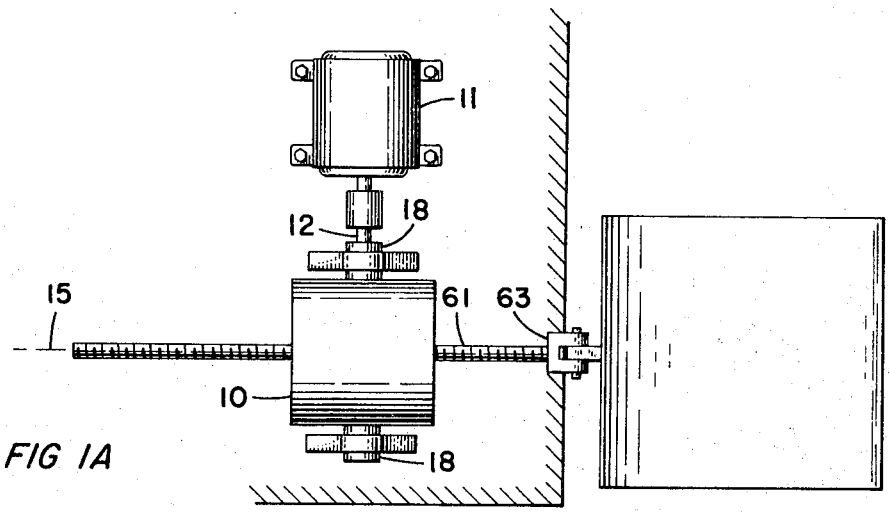
FIGS. 1A and 1B are diagrammatic representations of a positioning system incorporating the present invention.
Figure 1B:
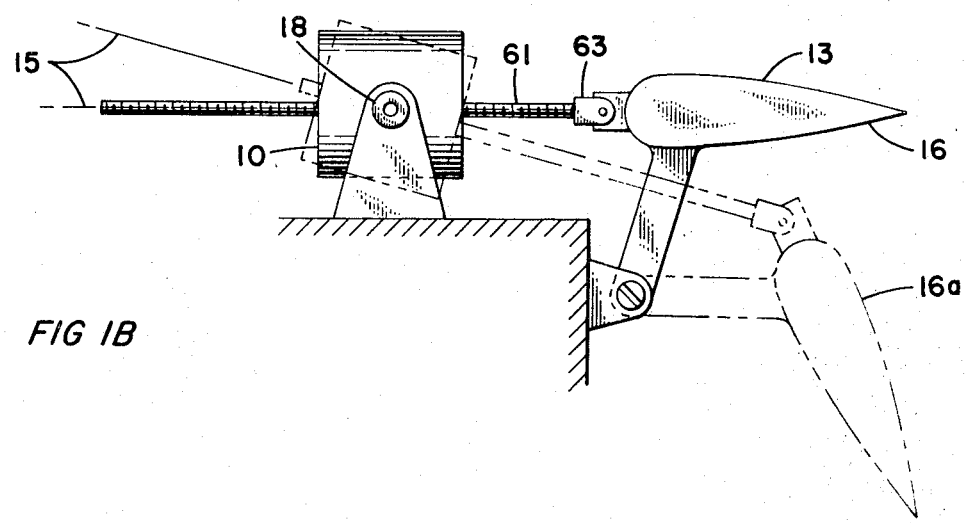

With reference to FIGS. 1A and 1B, a diagrammatic representation of a positioning system utilizing a ball-screw actuator 10 having incorporated therein a braking and coupling mechanism is shown in respective plan and elevation views. A reversible, rotary driving means 11 is connected to the actuator input connection 12, and a load 13 (e.g., an airplane control surface) is connected to the actuator ball-screw output shaft 61. As long as the actuator output shaft 61 is restrained from rotation about its axis, the actuator output shaft moves linearly back and forth through and along the actuator axis 15 in response to torques imparted to the actuator input connection 12. The preferred method for preventing rotation of the actuator output shaft 61 is to pivotally but nonrotatably connect it to a load 13 capable of to-and-fro movement relative to and along the axis of the actuator 10, but incapable of rotation about the actuator axis 15. The actuator 10 thus converts rotary motion to linear motion and moves and positions the load 13 between a first position 16 in which the load is shown in solid line and a second position shown at 16a in broken line. The actuator 10 functions to convert torque from the rotary driving means 11 to linear motion and transmit such linear motion to the load 13 when the driving means is operative and, concurrently, prevents forces from the load from being transmitted back to the driving means. The rotary driving means 11, therefore, cannot be overspeeded by forces from the load 13, nor can the forces from the load prevent precise positioning of the load by causing the driving means to overrun the desired load position. When the rotary driving means 11 is inoperative, the actuator 10 further acts as a brake which locks the load 13 in a set position and prevents forces from the load from being transmitted to the idle driving means.

In subsequent paragraphs, the direction of rotation of the actuator input connection 12 shall be determined by viewing its rotation from the input connection side of the actuator 10, and the direction of rotation of the remainder of the actuator components shall be determined by viewing the rotation from the end of the actuator that is opposite to the one where the output shaft 61 is connected to the load 13.

Figure 2:
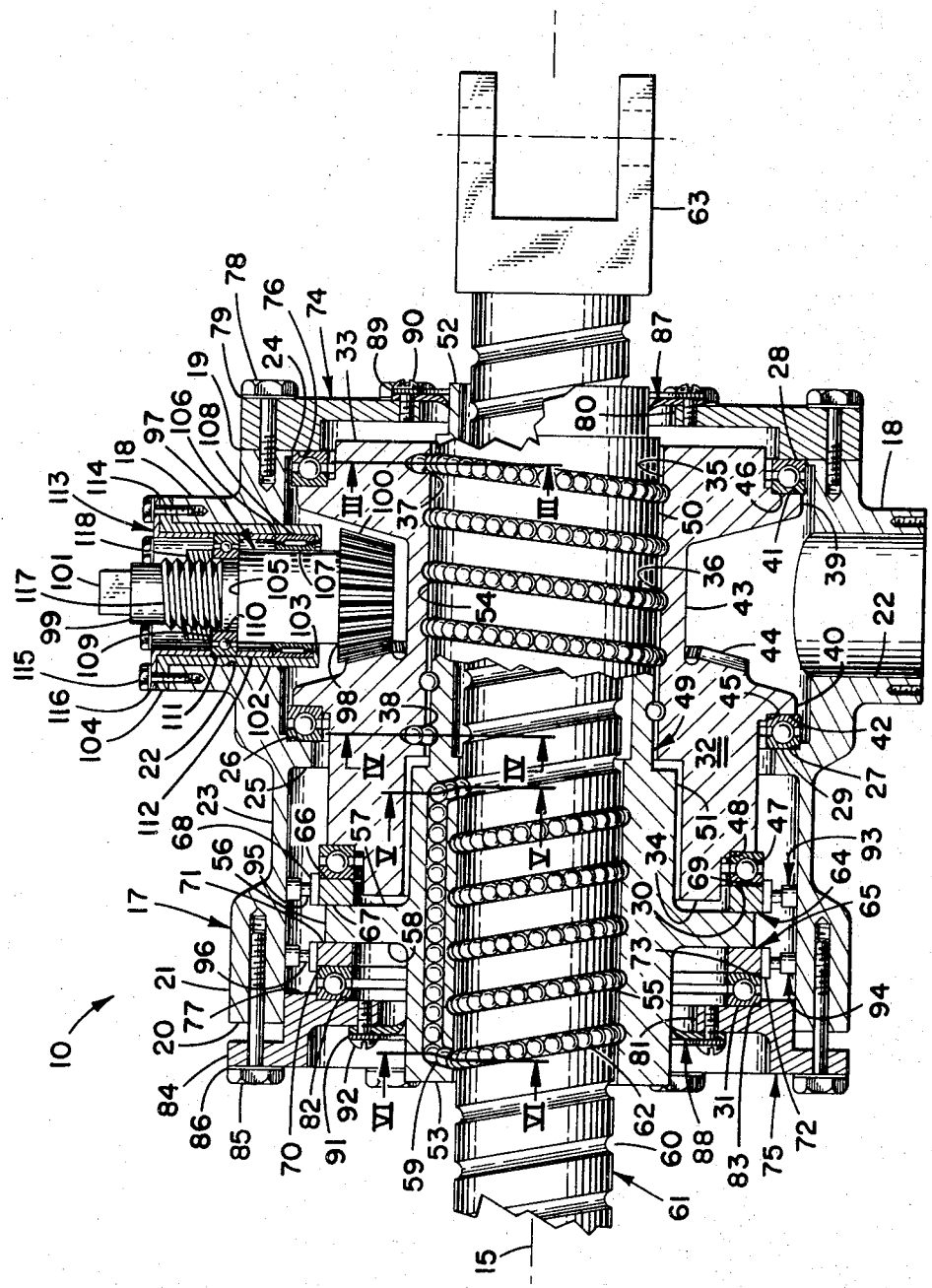
FIG. 2 is a longitudinal, partially sectional view of the actuator of the present invention.

Referring now to FIG. 2, the actuator 10 comprises a housing 17 preferably of a hollow, generally cylindrical shape having a longitudinal axis 15 and provided on its exterior with two mutually spaced and hollow, cylindrical trunnions 18 which provide means for pivotal mounting of the housing on any desired fixed structure. The trunnions 18 have axes that are coincident with each other and are perpendicular to a plane containing the housing axis 15. The housing 17 has first and second, open ends 19, 20 which are rigidly connected in a mutually fixed relationship by a wall 21 defined by the intervening material between the open ends of the housing and which open ends are transfixed by the housing longitudinal axis 15. A first passageway 22 laterally penetrating the housing wall 21 is provided through one of the trunnions 18, and, for added versatility, a similar passageway is provided through the other trunnion. For purposes of minimizing the housing weight, the housing external diameter preferably is reduced between the trunnions 18 and the housing second open end 19, thus forming an external groove 23. The housing 17 has an internal rim 24 at its first open end 19 and an internal flange 25 having a face 26 perpendicular to the housing axis 15 and facing toward the first open end 19. The flange 25 is located between the passageway 22 which laterally penetrates the housing and the housing second, open end 20, but nearer the lateral penetrations than the second, open end. At the base and on the side confronting the lateral passageway 22, the housing internal flange 25 is provided with a step 27 on which rests a race of thrust bearing 29 (to be described). A portion of the housing internal surface adjoining the step on which rests one race of the thrust bearing 29 and extending from that step 27 toward the lateral passageway 22 penetrating the housing underlies the other race of that same bearing in a manner allowing that other race to turn freely relative to the housing 17.

Figure 3:
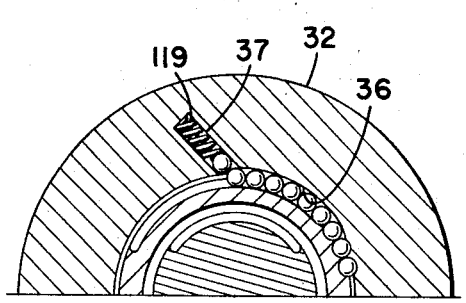
FIG. 3 is a partial, cross-sectional view taken along the line III—III in FIG. 2 and showing one end of the cylindrical structure thread opening into and connecting with the cylindrical structure first recess.
Figure 4:
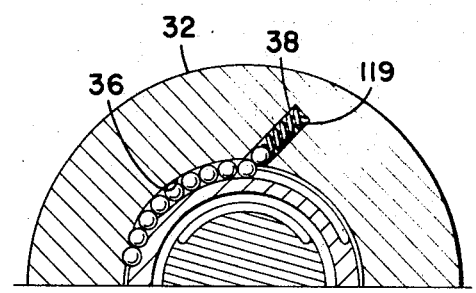
FIG. 4 is a partial, cross-sectional view taken along the line IV—IV in FIG. 2 and showing the opening into and connecting with the other end of the cylindrical structure thread in the cylindrical structure second recess.

A generally cylindrical structure 32 has first and second open ends 33, 34, a second passageway 35 which is circular in cross section and extends through the cylindrical structure coaxially therewith, and a longitudinal axis 15 coincident with the housing axis. The internal diameter of the cylindrical structure passageway 35 is larger in that portion of the cylindrical structure 32 from the second open end 34 to a point between the second recess 38 and the second, open end than is the diameter of the remaining portion of the cylindrical structure passageway. The cylindrical structure 32 has a rounded-bottom, helical thread 36 which is formed in the surface of the cylindrical structure forming the passageway 35. The thread 36 is of uniform depth throughout its length. First and second elongated recesses 37, 38 are formed in the cylindrical structure internal surface; the first recess is located adjacent the cylindrical structure first, open end 33 and the second recess is located intermediate the cylindrical structure first and second, open ends 33, 34. As shown in FIGS. 3 and 4, each end of the cylindrical structure internal thread 36 opens into and terminates with a respective recess 37, 38. Each recess 37, 38 preferably has a diameter larger than the diameter of the balls 62 (described later) which are located in the thread channels formed by the cylindrical structure internal thread 36 and the external thread of the sleeve 49 (described later). The recesses 37, 38 provide extensions of the cylindrical structure internal thread 36 to enable the balls 62, which substantially fill up the above-described thread channels, to roll along the threads 36, 54. The recesses 37, 38 have means for urging the balls 62 from the recesses and into the threads 36, 54; such means being preferably helical springs 119.

The cylindrical structure 32 shown in FIG. 2 has first and second externally located flanges 39, 40 each having a face 41 or 42 perpendicular to the cylindrical structure axis 15. The first-flange face 41 faces toward the housing and the cylindrical structure first open ends 19, 33, and the second-flange face 42 faces toward the housing and cylindrical structure second open ends 20, 34. The cylindrical structure 32 has an annular recess 43 between its first and second external flanges 39, 40. The bottom of the annular recess 43 is of uniform depth and thus forms a cylindrical, external surface which is coaxial with the cylindrical structure axis 15. The width of the annular recess 43 is smaller at its bottom than at its top, and the annular recess sidewalls are therefore tapered. A set of gear teeth 44 is formed on the annular recess sidewall nearer the cylindrical structure second external flange 40; the gear teeth thus encircle the cylindrical structure axis 15. A means for drivingly connecting the cylindrical structure 32 to the rotary driving means 11 is provided, said means having extension through the housing first passageway 22 and being in the form of a drive shaft 97 and gear 100 (described later), which gear engages the cylindrical structure gear teeth 44.

The face of the second cylindrical structure flange 40, which face 42 faces toward the cylindrical structure second open end 34, has provided therein a step 45 which is spaced from the cylindrical structure body external surface and on which is mounted one race of a thrust bearing 29 (to be described). On its face 41 which is the nearer to the cylindrical structure first open end 33, the first cylindrical structure flange 39 has a similar step 46 carrying a race of another thrust bearing 28 (to be described).

An external shoulder 47 is formed on the cylindrical structure 32 at the juncture of the exterior surface of the cylindrical structure and a portion of the cylindrical structure external surface which has a reduced diameter; the reduced diameter portion of the cylindrical structure exterior surface begins at the cylindrical structure second open end 34 and terminates at the cylindrical structure external shoulder. The cylindrical structure external shoulder 47 has provided therein a step 48 which is spaced from the reduced diameter portion of the cylindrical structure external surface and on which is mounted one race of a thrust bearing 30 (to be described).

Figure 5:
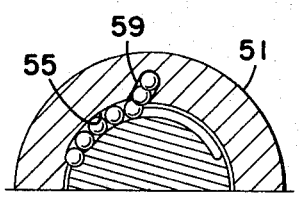
FIG. 5 is a partial, cross-sectional view taken along the line V—V in FIG. 2 and showing one end of the sleeve internal thread opening into and connecting with one end of the sleeve passageway.
Figure 6:
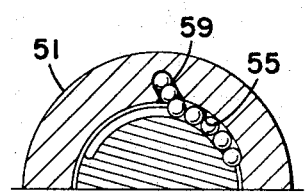
FIG. 6 is a partial, cross-sectional view taken along the line VI—VI in FIG. 2 and showing the other end of the sleeve, which end opens into and connects with the other end of the sleeve passageway.

A sleeve 49 having a hollow, generally cylindrical shape, a longitudinal axis 15, and first and second end portions 50, 51 is coaxially positioned within the housing 17 and cylindrical structure 32. Each sleeve end portion 50 or 51 has a respective end face 52 or 53 which is perpendicular to the sleeve axis 15. The sleeve first end portion 50 has a rounded-bottom, helical thread 54 which is formed on the external surface of the sleeve 49, which surface is symmetrically disposed about the sleeve axis 15. The external sleeve thread 54 is of uniform depth throughout its length and matches the cylindrical structure thread 36 in shape, depth, width, and direction. The sleeve first end portion external diameter is smaller than the sleeve second end portion external diameter, and the sleeve first end portion internal diameter is larger than the sleeve second end portion internal diameter. A portion of the sleeve first end portion 50 has a smaller external diameter than the external diameter of the remaining sleeve first end portion beginning at the sleeve first end face 52 and terminating a relatively small distance inwardly from the sleeve first end face. The sleeve second end portion 51 has a thread 55 formed in the inner, cylindrical surface of the sleeve 49, which surface is symmetrically disposed about the sleeve axis 15. The sleeve second end portion internal thread 55 is similar to the sleeve first end portion external thread 54, but opposite in direction to the external thread of the first end portion 50. The sleeve second end portion 51 has an external flange 56 formed or rigidly mounted on the exterior thereof. The sleeve flange 56 has first and second, parallel faces 57, 58 which are perpendicular to the sleeve axis 15. The sleeve second end portion 51 has a passageway 59 which connects the ends of the sleeve second end portion internal thread 55, thereby providing (in cooperation with the sleeve second end portion internal thread and the thread 60 formed on the shaft 61, discussed later) a closed loop for circulation of balls 62 (described later) within the sleeve second end portion internal thread. FIGS. 5 and 6 show the respective ends of the sleeve internal thread 55 connect and terminate with the sleeve second end portion passageway 59.

A cylindrical shaft 61 has a longitudinal axis 15 and extends coaxially through the sleeve 49 and the housing 17. The shaft 61 has a rounded-bottom, helical thread 60 which is formed in the surface of the shaft, which surface is symmetrically disposed about the shaft axis 15. The shaft thread 60 is of uniform depth throughout its length and matches the sleeve internal thread 55 in shape, depth, width, and direction. The means for drivingly connecting the shaft 61 to a load 13 (not shown in FIG. 2) and for preventing the shaft from rotating about its axis 15 comprises a clevis 63 rigidly attached to one end of the shaft.

Uniformly sized balls 62 are placed within the thread-channels cooperatively formed by the cylindrical structure internal thread 36 and the matching, in-register sleeve external thread 54 and the sleeve internal thread 55 and the matching, in-register shaft thread 60. The thread-channels are substantially filled with the balls 62, which balls are sized to have a close rolling fit with the thread-channels and drivingly connect the cylindrical structure 32 to the sleeve 49 and the sleeve to the shaft 61. The balls 62, therefore, enable the cylindrical structure 32 and the shaft 61 to transmit and receive torque-producing forces to and from the sleeve 49. The size of balls 62 filling the thread-channel formed by the cylindrical structure internal thread 36 and the sleeve external thread 54, however, may be different from the size of the balls filling the thread-channel formed by the sleeve internal thread 55 and the shaft thread 60.

A first annular member 64 has first and second side faces 66, 67 that are perpendicular to the first annular member and housing axes 15. A set of ratchet teeth 68 is formed in the circular outer surface of the first annular member 64. The first annular member second side face 67 confronts the sleeve external flange first face 57, and the first annular member first end face 66 is provided with an outwardly extending circular step 69 located nearer the outer surface of the first annular member 64, which surface contains the ratchet teeth 68, and on which step 69 rests a race of a thrust bearing 30 (to be described).

A second annular member 65 is substantially identical in construction to the first annular member 64, except that the two members are mirror images of each other. The second annular member 65 thus has first and second side faces 70, 71, a set of ratchet teeth 72 formed on its outer circular surface, and a step 73 provided on its first face on which rests a race of another thrust bearing 31 (to be described). The first and second annular members' second side faces 67, 71, consequently, mutually face each other; and each of them confronts a respective end face of the sleeve external flange 56.

The actuator 10 is provided with means coaxially mounting the cylindrical structure 32 and annular members 64, 65 within the housing 17 for rotation about the housing axis 15 and preventing translation of the cylindrical structure and annular members relative to the housing, which means will now be described. Employed in the above-mentioned means are first and second ball thrust bearings 28, 29 each having one race surrounding and mounted on a respective cylindrical structure flange step 45 or 46 and against a respective flange face 41 or 42. The outer surface of the remaining race of the first ball thrust bearing 28 rests within and against the housing rim 24 and is held against outward motion relative to the housing 17 by a first circular member 74 (described later). The remaining race of the second ball thrust bearing 29 rests on the housing internal flange step 27 and against the housing internal flange face 26. When thus mounted within the housing 17, the planes in which the surfaces of the races of the first and second ball thrust bearings lie are perpendicular to the housing axis 15.

Employed in the means coaxially and rotatably mounting the annular members are third and fourth ball thrust bearings 30, 31. The third ball thrust bearing 30 has one race which surrounds and is mounted on the cylindrical structure external shoulder step 48 and is positioned against the cylindrical structure external shoulder 47. The outer surface of the remaining race of the third ball thrust bearing 30 rests against the first annular member circular step 69 and is positioned against the first annular member first side face 66. The fourth ball thrust bearing 31 has one race positioned against the second annular member first side face 70 and an outer surface which is snugly surrounded by the second annular member circular step 73. The remaining race of the fourth ball thrust bearing 31 is held against radial and outwardly axial movement relative to the housing 17 by a second circular member 75 (described later). When thus mounted within the housing 17, the planes in which the surfaces of the races of the third and fourth ball-thrust bearings 30, 31 lie are perpendicular to the housing axis 15.

First and second circular members 74, 75 each having a respective side face 76 or 77 and a centrally located aperture 80 or 81 therethrough are each coaxially with and removably attached to a respective housing open end 19 or 20 by fastening means such as respective pluralities of bolts 78, 85 and lock washers 79, 86. When the circular members 74, 75 are attached to the housing 17, the circular member side faces 76, 77 are perpendicular to the housing axis 15. The first circular member 74 has an outer diameter approximately equal to the outer diameter of the housing 17, and the diameter of the aperture 80 is larger diameter than the external diameter of the sleeve first end portion 50, with which it is in register. Where necessary, the first circular member 74 is locally thinned to provide clearance between that member and the cylindrical structure first end 33. The face of the first circular member 76 faces inwardly with respect to the housing 17 and is thus in contact with both the housing first open end 19 and, as above mentioned, a race of the first ball thrust bearing 28.

The second circular member 75 (without regard to its flange, to be described) has an outer diameter slightly less than the internal diameter of the housing 17. The diameter of the second circular member aperture 81 is larger than the external diameter of the sleeve second end portion 51, with which it is in register. The face of the second circular member 75 extends within the housing second open end 20 and has a coaxial, circular recess 82 formed therein. The wall of the recess 82 forms a circular step 83 which is intermediate the inner and outer diameters of the second circular member. The race of the fourth ball thrust bearing 31 opposite to the one in contact with the second annular member 65 rests against the second circular member recess step 83 and against a portion of the bottom of the second circular member recess 82 between the step and the circular member aperture 81. The second circular member 75 has an outer flange 84 that has an outer diameter approximately equal to the outer diameter of the housing 17. The second circular member 75 is attached to the housing 17 by the above-mentioned fastening means 85, 86. Material of the second circular member 75 is preferably removed from its outer side for purposes of minimizing the weight of the actuator.

A means for applying a dragging force to the sleeve 49 for opposing rotary movement of the sleeve relative to the housing 17 comprises at least one annular, resilient component 87 or 88 positioned around one end of the sleeve and removably attached to the first or second circular member 74 or 75. The preferred actuator of FIG. 2 has a first annular, resilient component 87 having an outer diameter larger than the diameter of the first circular member aperture 80 and an internal diameter smaller than the diameter of the reduced external diameter portion of the sleeve first end portion 50 adjacent the sleeve first end face 52. The first resilient component 87 is coaxial with and removably attached to the side of the first circular member 74 that is opposite to the one containing the face 76 by a first thin, annular retainer 89 and screws 90. The first resilient component 87 is thinned in the region of its internal diameter to increase its flexibility in this region and thus facilitate the interference installation of the first resilient component around the reduced-diameter portion of the sleeve first end portion 50. Although not essential, the actuator of FIG. 2 also has a second annular, resilient component 88 having an outer diameter larger than the diameter of the second circular member aperture 81 and an internal diameter smaller than the external diameter of the sleeve second end portion 51. The second resilient component 88 is coaxial with and removably attached to the side of the second circular member 75 that is opposite to the one containing the face 77 by a second thin, annular retainer 91 and screws 92. As in the case of the first resilient component 87 and for the same reason, the thickness of the second resilient component 88 is thinned at its internal diameter. Besides providing a dragging force to the sleeve 49, the resilient components 87, 88 also serve as dust or lubricant seals to prevent the entry of foreign matter into the actuator 10 or to retain a lubricant. It will be understood that the means for applying a dragging force to the sleeve 49 for opposing rotary movement of the sleeve relative to the housing 17 may comprise any suitable structure slidingly connected between the sleeve and the housing.

A means for preventing a first rotative movement of the first annular member 64 in the counterclockwise direction and a means for preventing a second rotative clockwise direction of movement of the second annular member 65 with respect to the housing axis 15 are preferably provided in the form of two pair of ratchets 93, 94. A first and second pair of pawls 95, 96 are mounted on the interior of the housing 17 at locations in which each pawl is adjacent and confronts a respective set of annular member ratchet teeth 68, 72. Each pawl of the pair of pawls 95, 96 is mounted 180 degrees apart and engaged with the ratchet teeth of its associated annular member 64, 65 to prevent counterclockwise movement of the first annular member and clockwise movement of the second annular member.

The thread directions (i.e., right-hand or left-hand) of the cylindrical structure internal thread 36 and corresponding sleeve external thread 54 and the sleeve internal thread 55 and corresponding shaft thread 60 are dependent on the desired locking directions of the annular members' ratchets 93, 94. The embodiment in FIG. 2 necessarily depicts a right-hand thread for the sleeve internal thread 55 and a right-hand thread for the shaft external thread 60 to correspond with the locking against counterclockwise direction of movement by the first annular member ratchets 93.

A means for drivingly connecting the cylindrical structure 32 to the rotary driving means 11 (refer to FIG. 1A) comprises a drive shaft 97 which has first and second ends 98, 99 and that is rotatably mounted within the housing first passageway 22, the shaft 97 having a gear 100 rigidly mounted on its first end. The gear 100 is in engagement with the set of gear teeth 44 formed in the cylindrical structure, and the drive shaft second end 99 is provided with means for drivingly connecting it to the rotary driving means 11, said means for drivingly connecting being a square male fitting 101.

The manner of rotatably mounting the drive shaft 97 preferably employs a tubular member 102 having an internal flange 103 on one end and an external flange 104 on the other end. When the tubular member 102 is positioned, internal flange end first, within the housing first passageway 22, the outside diameter of the tubular member has a close sliding fit with the inner surface of the housing first passageway. The outer diameter of the tubular member external flange 104 is approximately equal to the outer diameter of the trunnion 18. The portion of the drive shaft between its second end 99 and a point intermediate the drive shaft first and second ends 98 and 99 has a reduced diameter, and a shoulder 105 is thus formed at the juncture of these two portions of the drive shaft 97. A roller bearing 106 has an inner race 107 that surrounds and is mounted on the drive shaft 97 at a location intermediate the rigidly attached gear 100 and the drive shaft shoulder 105 and an outer race 108 that rests against the tubular member internal flange 103 and the internal surface of the tubular member 102. A ball thrust bearing 109 has an inner race 110 that surrounds and is mounted on the portion of the drive shaft 97 having the reduced diameter and which is positioned against the drive shaft shoulder 105. The ball thrust bearing outer race 111 has a close, sliding fit with the inner surface of the tubular member 102.

A first annular spacer 112 is positioned between and in contact with the roller and ball thrust bearing outer races 108, 111.

A second annular spacer 113 having an external flange 114 on one end and a close sliding fit with the internal diameter of the tubular member 102 is positioned within the tubular member with its flange resting on the tubular member flange 104. The end of the second annular spacer 113 opposite to the one with the flange 114 rests against the outer race of the ball thrust bearing 109. The tubular member and second annular spacer external flanges 104, 114 are removably attached to the trunnion by a plurality of bolts 115 and lockwashers 116.

The reduced diameter portion of the drive shaft has an externally threaded portion 117 on which a nut 118 is positioned. The nut 118 is tightened against the inner race of the ball thrust bearing 109 to clamp the race 110 between the nut and the drive shaft shoulder 105.

In operation, the axial position of the second circular member 75 (FIG. 2) is adjusted by the second circular member bolts 85 to bring the second annular member into relatively light dragging contact with the sleeve flange second face 58. Adjustment of the contacting force between the second annular member 65 and the sleeve flange 56 can be readily effected by tightening or loosening the second circular member bolts 85.

With added reference to FIGS. 1A and 1B, the actuator 10 of the foregoing construction and arrangement has several functional modes, in all of which modes the housing 17 is pivotally mounted on any suitable, fixed structure by means of the trunnions 18. The first functional mode of the actuator 10 is one in which the driving means 11 is in the power-off condition and a load-produced force is received by the shaft 61, which force tends to move the shaft toward its retracted position, wherein the clevis 63 is near the housing first open end 19. The force thus imposed on the shaft 61 by the load 13 is transmitted from the shaft to the sleeve 49 through the interconnecting plurality of balls 62 located within the shaft and corresponding internal sleeve threads 60, 55. As the shaft 61 is prevented from rotation relative to the actuator 10 by its connection at the clevis 63 to a load, a wedging action of the balls 62 converts the axial force being transmitted to the sleeve 49 from the shaft into force components: namely, an axial-thrust force and a rotational force. The thrust force acts in a direction that moves the sleeve flange 56 into firm contact with the second annular member 65 and, concurrently, the rotational force acts in a direction which tends to rotate the sleeve 49 in the clockwise direction. The clockwise rotational force thus imposed on the sleeve 49 rotates the sleeve a relatively small angular distance in the clockwise direction (e.g., approximately 1 degree) before the sleeve is moved into firm contact with the second annular member 65. The second annular member 65 is limited to rotation in the counterclockwise direction by its associated ratchets 94; thus, the second annular member prevents clockwise rotation of the sleeve 49 promptly upon the sleeve being strained against it by the axial thrust force. During the incipient rotation of the sleeve 49 and while transmitting the load-produced force from the shaft 61 to the sleeve, the balls 62 roll, for a relatively short distance (e.g., approximately 0.02 inch), along the thread-channels formed by the shaft and sleeve internal threads 60, 55 and through the sleeve passageway 59 which connects the ends of the sleeve internal thread. As soon as the sleeve 49 is braked and locked, the balls 62 stop rolling along the thread-channels. Before forces are transmitted from the sleeve 49 to the cylindrical structure 32 by the interconnecting plurality of balls 62 located within the sleeve external thread and cylindrical structure internal thread 54, 36, the second annular member 65 brakes and locks the sleeve relative to the housing 17. In this functional mode, therefore, the actuator 10 not only restricts a load 13 which imposes a force on the shaft 61 to a negligible movement, but also prevents the load from being transmitted back to the idle driving means 11 which is connected to the actuator drive shaft second end 99 that forms the input member connection 12.

The second functional mode to be discussed is one in which the driving means 11 is in the power-off condition and the above-mentioned load 13 is reversed and tends to move the shaft 61 to its extended position, wherein its clevis 63 is most widely spaced from the housing first open end 19. In this mode, as in the first functional mode, the load-produced force is transmitted from the shaft 61 to the sleeve 49 through the balls 62 which are located within the thread-channels formed by the shaft thread 60 and sleeve internal thread 55. While transmitting the load-produced force to the sleeve 49, the wedging action of the balls 62 converts this force into a thrust and a rotational force. The thrust force in this functional mode acts in a direction that tends to unlock the sleeve flange 56 from the second annular member 65 by relieving the strain of the sleeve flange against the second annular member and moves the sleeve flange away from the second annular member and into firm contact with the first annular member 64. Concurrently, the rotational force received by the sleeve 49 tends to rotate the sleeve in the counterclockwise direction and thus to move the flange away from the second annular member 65 and toward the first annular member 64. Before coming into firm contact with the first annular member 64, the sleeve 49 rotates relative to the housing axis 15 a relatively small angular distance in the counterclockwise direction. The first annular member 64, however, is limited to rotation in the clockwise direction by its associated ratchets 93; thus, the first annular member prevents counterclockwise rotation of the sleeve 49 when the sleeve is strained against it by the axial thrust force. During this small rotational movement of the sleeve 49 (as in every rotational movement by the sleeve) the balls 62 roll along the thread-channels formed by the shaft and internal sleeve threads 60, 55 and circulate through the sleeve passageway 59 which connects the ends of the sleeve internal thread. The direction in which the balls 62 roll within and the length of movement by the balls along the thread-channels and sleeve passageway 59 depend on the angular movement of the sleeve 49 with respect to the housing axis 15. Just as in the first functional mode, the first annular member 64 and associated ratchets 93 brake and lock the sleeve relative to the housing 17 before any force can be transmitted from the sleeve to the cylindrical structure 32 by the interconnecting plurality of balls 62 located within the sleeve external thread 54 and cylindrical structure internal thread 36.

The larger the load-imposed force while operating in this functional mode, the larger the axial thrust force which forces the sleeve flange 56 against the first annular member 64; thus, the actuator 10 eliminates brake slippage attributable to load-imposed forces, whether such forces are large or suddenly applied. Elimination of brake slippage attributable to load-imposed forces prevents the load 13 from moving out of a set position. In this second functional mode, therefore, the actuator 10 restricts a load 13 which applies a force in the direction tending to extend the shaft 61, while the driving means 11 is in the power-off condition, to negligible movement and, concurrently, prevents the load 13 from being transmitted back to the idle driving means which is connected to the actuator drive shaft second end 99 that forms the input connection 12.

A third functional mode is one in which the driving means 11 is initially in the power-off condition and there is imposed on the shaft 61 a load-produced force which tends to move the shaft to its retracted position and in which the driving means subsequently is selectively activated to the power-on and counterclockwise output torque condition wherein a counterclockwise torque is applied to the drive shaft of the actuator 10 for repositioning the load 13 through movement of the shaft in the "retract" or aiding direction. By "an aiding load" or "a load acting in the aiding direction" it is meant that the object to be moved by the actuator 10 tends to be moved by other forces (e.g., airloads) in the same direction as that in which the actuator and driving means 11 is attempting to move it. An "opposing load," of course, is one in which the object to be moved by the actuator 10 tends to be moved by other forces in an opposite direction to that in which the actuator and driving means 11 are attempting to move it. During the repositioning of the load 13 that occurs during operation in the third functional mode, the direction of the load-imposed force may be temporarily reversed to act in the "extend" or opposing direction. Before the desired position of the load 13 is reached, the direction of the load-imposed force on the shaft 61 may be returned to the "retract" direction. The following description of the third functional mode, therefore, depicts a repositioning of a load 13 that initially acts in the aiding direction, changes to an opposing direction, and changes back to the aiding direction; whereupon, after the desired load position is reached, the driving means 11 is deactivated to its power-off condition, and the functional mode reverts from the third functional mode back to the first functional mode wherein the load is locked, relative to the actuator housing 17, in a precise position.

To effect this repositioning of the load 13, the torque provided by the driving means 11 rotates the drive shaft 97 and the drive shaft gear 100 in the counterclockwise direction. The drive shaft gear 100 is meshed with the set of gear teeth 44 formed on the cylindrical structure 32 and thus drives the cylindrical structure in the clockwise direction. The cylindrical structure 32 transmits the driving-means torque it receives to the sleeve 49 through the plurality of interconnecting balls 62 located in thread-channels formed by the cylindrical structure internal thread 36 and the corresponding sleeve external thread 54. The sleeve 49 in turn transmits the driving-means torque to the shaft 61 through the plurality of balls 62 located with the sleeve internal thread 55 and corresponding shaft thread 60, and the shaft 61 responds by linearly moving and retracting through the actuator 10 and thus repositioning the load 13.

Prior to activating the driving means 11, the actuator 10 functions in a manner similar to its operation during the first functional mode (i.e., the load-produced force components received by the sleeve 49 act axially toward the second annular member 65 and rotationally in the clockwise direction). As in the first functional mode, the sleeve 49 is forced against the second annular member 65, and the sleeve and second annular member are locked together against further relative rotational movement with respect to each other. The sleeve 49 tends to rotate in the clockwise direction, but is locked against rotational movement relative to the housing 17 by the second annular member 65 in cooperation with its clockwise, rotation-preventing ratchets 94. The actuator 10, therefore, locks the load 13 against movement relative to the actuator.

To effect repositioning of the load 13 in this functional mode, the driving means 11 is activated to the power-on and counterclockwise torque output condition. The counterclockwise torque thus imposed on the drive shaft 97 and drive shaft gear 100 by the driving means 11 drives the cylindrical structure 32 in the clockwise direction. The cylindrical structure 32 transmits the clockwise torque to the sleeve 49 through the interconnecting balls 62 located in the thread-channel formed by the cylindrical structure internal thread 36 and the sleeve external thread 54.

The lightly dragging contact of each of the annular, resilient components 87, 88 against the sleeve 49, however, produces a force on the sleeve that opposes the incipient rotation of the sleeve, thereby tending to cause momentary, relative rotation between the sleeve and the cylindrical structure 32. This relative rotation between the sleeve 49 and cylindrical structure 32 immediately initiates a wedging action between the balls 62 and the sides of the thread channels at both the shaft and cylindrical structure, thus substantially eliminating internal slippage within the actuator 10 and, consequently, promoting precise positioning of the load 13. The wedging action of the balls 62 converts the torque being transmitted to the sleeve 49 from the cylindrical structure 32 into torque-equivalent force components which are similar to the force components generated by the wedging action of the balls located in the shaft and sleeve internal threads 60, 55 described in the first and second functional modes: namely, an axial thrust-force and a rotational force.

While transmitting the torque to the sleeve 49, the balls 62 move (as will be described) along channels formed by the cylindrical structure internal thread 36 and sleeve external thread 54 for a relatively short distance (e.g., approximately 0.02 inch) in a direction toward cylindrical structure second recess 38. Each cylindrical structure recess 37 or 38 has a means for urging the balls 62 from the recesses; the embodiment shown in FIGS. 2, 3, and 4 utilize compressed helical springs 119 for such ball-urging means. Movement of the balls 62 in this functional mode thus results in additional compression of the helical spring 119 contained in the second cylindrical structure recess 38 and lessens the compression of the other helical spring contained in the first cylindrical structure recess 37. Such ball movement is required to permit the balls 62 to roll rather than skid in the thread-channels, and thus to protect the thread-channels from excessive wear. The amount of ball movement is directly related to the amount of relative movement between the cylindrical structure 32 and the sleeve 49, and such relative movement between the cylindrical structure and sleeve is dependent upon the axial travel of the sleeve relative to the housing 17, which axial movement is limited to the clearance between the annular members 64, 65 and respective sleeve flange faces 57, 58. The movement of the sleeve 49 relative to the cylindrical structure 32 and movement of the balls 62 along the thread-channels formed by the cylindrical structure and sleeve external threads 36, 54 are both relatively small.

The axial thrust force received by the sleeve 49 from the cylindrical structure 32 acts in a direction which moves the sleeve flange 56 away from the second annular member 65 and toward the first annular member 64, thus relieving the strain of the sleeve flange against the second annular member, which strain against the second annular member was caused by the load-imposed force. The rotational force components received by the sleeve 49 from the driving means 11 and the load 13 both act in the clockwise direction. If the load-produced forces received by the sleeve 49 are relatively large, the force components received by the sleeve from the driving means 11 reduce the force holding the sleeve against the second annular member 65 enough to permit slippage between the sleeve flange 56 and second annular member. If large enough, the outside forces acting on the load 13 (e.g., wind forces on an airplane control surface) actually reposition the load with the driving means 11 simply releasing the brakes of the braking-coupling actuator 10. During this repositioning of a relatively large aiding load, the sleeve flange second face 58 continually slips against the second annular member 65; and, since the cylindrical structure 32 and sleeve 49 are locked together by their interconnecting balls 62, the cylindrical structure and sleeve rotate together about their common axis 15. When the sleeve 49 rotates, it transmits a net rotational force which acts in the clockwise direction to the shaft 61 through the interconnecting balls 62 located in the thread channels formed by the sleeve internal thread 55 and the shaft thread 60. The wedging action of the balls 62 converts the clockwise rotational force transmitted to the shaft 61 into an axial thrust-force which acts in the "retract" direction and a rotational force which is neutralized by the means which prevents rotation of the shaft relative to the housing axis 15 (as will be described). The shaft 61 thus retracts linearly through and outwardly from the housing second open end 20.

In the preferred embodiment depicted in FIGS. 1A, 1B, and 2, the means for preventing the shaft 61 from rotating comprises a clevis 63 rigidly attached to one end of the shaft, which clevis is pivotally but nonrotatably connected to a load 13 capable of to-and-fro motion relative to and along the axis of the actuator 10, but incapable of rotation about the actuator axis 15. A number of alternate ways of preventing rotation of the shaft 61 about its own axis 15 may, of course, be effectively utilized in lieu of a connection to a load 13 incapable of rotation about the actuator axis; as for example, a pin mounted through the shaft end opposite to the end connected to the load, which pin rides in a groove or elongated slot formed in a component fixedly mounted on structure that is fixed relative to the pivotal mountings of the actuator 10 (example not shown).

If the load-produced force received by the sleeve 49 is relatively small, the force components of the torque received by the sleeve from the driving means 11 overcome the load-produced force holding the sleeve against the second annular member 65, and the net axial force acts in the direction of the first annular 64; the sleeve flange 56 thus moves from contact with the second annular member and into contact with the first annular member. The first annular member 64 is free to rotate in the clockwise direction, and the first annular member, sleeve 49, and cylindrical structure 32 therefore rotate as an assembly and in that direction, thereby driving the shaft 61, as explained above, in the "retract" direction.

When the load-imposed force received by the shaft 61 changes from acting in the "retract" direction to the "extend" direction, the load-imposed force component received by the sleeve 49 from the shaft also changes direction. The axial thrust-force from the load 13 acts in the direction which tends to move the sleeve 49 toward the first annular member 64, and the rotational force from the load acts in the counterclockwise direction. The net axial thrust force received by the sleeve 49 acts to move the sleeve toward the first annular member 64 and thus moves the sleeve flange 56 away from the second annular member 65 and into firm contact with the first annular member 64. As the driving-means torque is always greater than an opposite, load-produced torque, the net rotational force component received by the sleeve 49 acts in the clockwise direction. The sleeve 49 thus continues to transmit a clockwise rotational force to the shaft 61 through the interconnecting balls 62. The actuator 10, therefore, smoothly and efficiently continues the repositioning of the load 13 in the "retract" direction, during which time the ratchets 93 allow free rotation of the first annular member 64.

Before the desired position of the load 13 is reached and in the example described, the direction of the load-imposed force returns to the original "retract" direction. The net forces received by the sleeve 49 return it from contact with the first annular member 64 to slight, dragging contact with the second annular member 65. Since both the load and the driving-means rotational force components act in the clockwise direction, the net rotational force received by the sleeve 49 continues to be in the clockwise direction. The sleeve 49 thus continues to transmit a clockwise rotational force to the shaft 61 through the interconnecting balls 62. The shaft 61 which is restrained from rotation about its axis 15, continues to move the load 13 smoothly in the "retract" direction.

When the desired position of the load 13 is reached and upon the driving means 11 being deactivated to place it in its power-off condition, the torque applied by the driving means to the cylindrical structure 32 through the drive shaft 97 and gear 100 is eliminated. The forces received by the sleeve 49 are substantially the same as described in the first functional mode, and the load 13 is precisely locked in a set position.

The third functional mode illustrates that the actuator 10 is as durable, reliable, and smooth in operation when positioning an aiding load as when positioning an opposing load; for, although slippage may occur between the sleeve flange 56 and one of the annular members 64 or 65, the contact between the sleeve flange and respective annular member is relatively light, and the contacting surface areas are relatively large. The pressure of the sleeve flange 56 against a respective annular member 64 or 65, when slippage occurs during the repositioning of an aiding load, is relatively low; thus, no galling or rapid wear occurs. Moreover, such light contact between the relatively large contacting surface areas of the sleeve flange 56 against a respective annular member 64 or 65 prevents a large temperature increase in the rubbing parts.

A fourth functional mode is one in which the driving means 11 is initially in the power-off condition, the load-imposed force on the shaft 61 acts in the "retract" direction, and the driving means subsequently is selectively activated to the power-on and clockwise output torque condition to reposition the load 13 by moving the shaft in the "extend" direction. This is an opposing-load condition, since the load-imposed force tends to retract the load 13 and the driving means 11 attempts to extend the load. Prior to activating the driving means 11, the actuator 10 is in the same condition as described in the first functional mode. After activation of the driving means 11 in the fourth functional mode, the cylindrical structure 32 is driven by the drive shaft 97 and drive shaft gear 100 in the counterclockwise direction. The driving-means torque received by the cylindrical structure 32 is transmitted to the sleeve 49 in a manner similar to that which occurs in the third functional mode, except that the balls 62 located in the thread-channels formed by the cylindrical structure and sleeve external thread 36, 54 roll a relatively short distance in a direction toward the cylindrical structure first recess 37 and the driving-means torque components received by the sleeve act in opposite directions relative to those in the third functional mode. In this fourth functional mode, the axial thrust force component received by the sleeve 49 from the driving means 11 acts in a direction toward the second annular member 65, thus adding to the axial thrust force produced by the load 13 and uninterruptingly continuing the strain of the sleeve flange 56 against the second annular member; as a consequence, the sleeve and second annular member remain locked together against rotational movements relative to each other. Simultaneously with the above, a rotational force component of the torque received by the sleeve 49 from the driving means 11 tends to rotate the sleeve in the counterclockwise direction, a direction opposite to the direction that the load 13 tends to rotate the sleeve. Since the counterclockwise rotational force component of the torque received by the sleeve 49 from the driving means 11 is larger than the clockwise rotational force component received by the sleeve from the load 13, the net rotational force imposed on the sleeve acts in the counterclockwise direction; therefore, the sleeve departs from a tendency to rotate in the clockwise direction and tends to rotate in the counterclockwise direction. The second annular member 65 is free to rotate in the counterclockwise direction, for its associated ratchet 94 prevents only clockwise rotation; therefore, the mutually locked sleeve flange 56 and second annular member are free to rotate with the cylindrical structure 32 in the counterclockwise direction. Concurrently with the above, the sleeve 49 transmits the net rotational force component, as a counterclockwise torque, to the shaft 61 through the interconnecting balls 62 located in the sleeve internal thread 55 and the shaft thread 60. The wedging action of the balls 62 located in the thread-channels formed by the sleeve internal thread 55 and shaft thread 60 converts the counterclockwise torque transmitted by the sleeve 49 to the shaft 61 into a rotational force which acts in the counterclockwise direction and an axial thrust force which acts in the "extend" direction. The shaft 61, as described before, moves linearly, under the influence of the axial thrust force, in the "extend" direction.

When the desired position of the load 13 is reached and upon the driving means 11 being deactivated to place it in its power-off condition, the torque applied by the driving means to the cylindrical structure 32 through the drive shaft 97 and gear 100 is eliminated. The cylindrical structure 32, thus having ceased to be driven by the driving means 11 in the counterclockwise direction, has only a load-produced force on it, which force immediately tends to reverse the counterclockwise rotation of the sleeve 49.

When the driving means 11 is deactivated, therefore, the axial thrust and rotational forces received by the sleeve 49 are substantially the same as described in the first functional mode (i.e., the axial thrust force acts in the direction towards the second annular member 65 and the rotational force acts in the clockwise direction). Since the axial thrust force acts in the same direction, whether the driving means 11 is in the power-on or power-off condition, the sleeve 49 remains uninterruptedly locked to the second annular member 65. The clockwise, load-produced force received by the sleeve 49 tends to rotate the sleeve in the clockwise direction, but such rotation is immediately braked and locked, relative to the housing 17 and with substantially no possibility of motion of the sleeve relative to the housing, by the second annular member 65 and its associated clockwise rotation opposing ratchet 94. When the sleeve 49 is thus locked, the shaft 61 and the load 13 connected thereto are also similarly locked. Because the actuator is capable of the operations described above in connection with its third and fourth functional modes, intentionally provided looseness (necessary in many existing braking-coupling actuators) is not required in the present actuator 10; and the actuator, because of the absence of such looseness, is thus capable of providing precise positioning of the load 13. Furthermore, the braking-coupling actuator 10, without requiring close manufacturing tolerances, is devoid of any looseness of connection which is above the negligible and acceptable limits within which synchronization of multiple positioning systems is obtainable.

A fifth functional mode is one in which the driving means 11 is initially in the power-off condition, the load-imposed force on the shaft 61 acts in the "extend" direction, and the driving means subsequently is selectively activated to the power-on and counterclockwise output torque condition to reposition the load 13 by moving the shaft in the "retract" direction. This functional mode involves an opposing-load condition, since the load-imposed force tends to extend the shaft 61 and the driving means 11 attempts to retract the load. Prior to activating the driving means 11, the actuator 10 is in the same condition as described in the second functional mode. After activation of the driving means 11 in this functional mode, the cylindrical structure 32 is driven, by the drive shaft 97 and drive shaft gear 100, in the clockwise direction. The driving-means torque received by the cylindrical structure 32 is transmitted to the sleeve 49 in a manner similar to that in the third and fourth functional modes. In this fifth functional mode, the axial thrust force component received by the sleeve 49 from the driving means 11 acts in a direction tending to move the sleeve toward the first annular member 64 and thus adds to the axial thrust force produced by the load 13 and uninterruptingly continues the strain of the sleeve flange 56 against the first annular member; as a consequence, the sleeve and second annular member remain locked together against rotational movement relative to each other. Concurrently with the above, a rotational force component of the torque received by the sleeve 49 from the driving means 11 tends to rotate the sleeve in the clockwise direction, a direction opposite to the direction that the load 13 tends to rotate the sleeve. Since the clockwise rotational force component of the torque received by the sleeve 49 from the driving means 11 is larger than the counterclockwise rotational force component received by the sleeve from the load 13, the net rotational force imposed on the sleeve acts in the clockwise direction; therefore, the sleeve departs from a tendency to rotate in the counterclockwise direction and tends to rotate in the clockwise direction. The first annular member 64 is free to rotate in the clockwise direction, for its associated ratchet 93 prevents only counterclockwise rotation; therefore, the mutually locked sleeve flange 56 and first annular member are free to rotate, with the cylindrical structure 32, in the clockwise direction. During the above, the sleeve 49 transmits the net rotational force component, as a clockwise torque, to the shaft 61 through the interconnecting balls 62 located in the sleeve internal thread 55 and the shaft thread 60. The wedging action of the balls 62 located in the thread-channels formed by the sleeve internal thread 55 and shaft thread 60 converts the clockwise torque transmitted by the sleeve 49 to the shaft 61 into a rotational force and an axial thrust force. The means 63 for preventing the shaft 61 from rotating about its axis 15 neutralizes the rotational force received by the shaft; but the axial thrust force received by shaft, which acts in the "retract" direction, moves the shaft and load 13 in the "retract" direction of the shaft.

When the desired position of the load 13 is reached and upon the driving means 11 being deactivated to place it in its power-off condition, the torque applied by the driving means to the sleeve 49 through the cylindrical structure 32, the drive shaft 97, and gear 100 is eliminated. The sleeve 49, thus having ceased to be driven by the driving means 11 in the clockwise direction, has only a load-produced force imposed on it, and the load-produced force immediately tends to reverse the clockwise rotation of the sleeve, which tendency is prevented by means described below.

When the driving means 11 is deactivated, therefore, the axial thrust and rotational forces received by the sleeve 49 are substantially the same as described in the second functional mode (i.e., the axial thrust force acts in the direction tending to move the sleeve flange 56 toward the first annular member 64 and the rotational force acts in the counterclockwise direction). Since the axial thrust force acts in the same direction, whether the driving means 11 is in the power-on or power-off condition, the sleeve 49 remains uninterruptedly locked to the first annular member 64. The counterclockwise, load-produced force received by the sleeve 49 tends to rotate the sleeve in the counterclockwise direction, but such rotation is immediately braked and locked, relative to the housing 17 and with substantially no possibility of motion of the sleeve relative to the housing, by the first annular member 64 and its associated, counterclockwise rotation opposing ratchet 93. When the sleeve 49 is thus locked, the shaft 61 and the load 13 connected thereto are also similarly locked.

If, before reaching the desired position of the load 13, the load-imposed force on the shaft 61 reverses and acts in the "retract" direction, then the load-imposed force components received by the sleeve 49 act in opposite directions; namely, a thrust force component which tends to move the sleeve flange 56 toward the second annular member 65 and a rotational force component which tends to move the sleeve in the clockwise direction. The axial thrust force component of the load-imposed force thus opposes the axial thrust force component received by the sleeve 49 from the driving means 11, and the rotational force component of the load-imposed force acts in the same direction as that of the rotational force component received by the sleeve 49 from the driving means.

The net axial thrust force received by the sleeve 49 continues to act in a direction toward the first annular member 64, but decreases in magnitude after the change in direction of the load-imposed force. Thus, the sleeve 49 initially remains uninterruptedly locked to the first annular member 64. When the direction of the net axial thrust force component changes, as is the case when the net rotational force component received by the sleeve 49 is greater than the rotational force component of the driving means torque received by the sleeve, the net axial thrust force unlocks the sleeve from the first annular member 64 by relaxing the strain of the sleeve from the first annular member and moves the sleeve away from contact with the first annular member and into contact with the second annular member 65. Since the second annular member 65 is prevented from clockwise rotation by its associated ratchet 94, braking of the sleeve occurs as soon as the clockwise-rotating sleeve 49 contacts the second annular member. Consequently, the load 13 cannot overspeed the driving means 11 when acting in the aiding direction relative to the torque-direction of the driving means; moreover, an aiding load cannot prevent precise positioning of such load, for as soon as the desired position is reached and upon the driving means being placed in its power-off condition, the torque applied to the sleeve 49 by the driving means is eliminated and the braking-coupling actuator 10 immediately reverts to its first functional mode of operation. Once the actuator 10 is in the first functional mode of operation, the load 13 is immediately locked, relative to the housing 17 and with substantially no possibility of movement of the sleeve 49 relative to the housing, as described in connection with the first functional mode. The sleeve responds substantially immediately to forces received by it from the driving means. Thus, the sleeve locks or unlocks relative to the housing substantially immediately in response to activation or deactivation of the driving means. Consequently, the actuator 10 permits movement of the load 13 in small, accurately controlled increments by manual or automatic activation and deactivation of the driving means 11.

Unlike the existing braking-coupling actuators, the actuator 10 described herein contains a mechanical brake-releasing mechanism of a construction which eliminates the need of excessive torque to override or to disengage brakes in order to position a load. It is important to note that the brake-releasing mechanism of the present actuator 10 utilizes force components to disengage and shift the sleeve 49 from the annular member 64 or 65 that brakes and locks the load 13 relative to the housing 17, with the aid of an associated ratchet 93 or 94, to the annular member that has an associated ratchet that permits rotation in the rotative direction of the driving means torque and thus permits the driving means 11 to reposition the load. The operations which occur in the fifth functional mode further illustrate that such an actuator 10 is as durable, reliable, and smooth in operation when positioning a load which acts in the aiding direction relative to the torque direction of the driving means 11 as it is when positioning a load which acts in the opposing direction relative to the torque direction of the driving means.

The sixth and last functional mode is one in which the driving means 11 is initially in the power-off condition, the load-imposed force on the shaft 61 acts in the "extend" direction, and the driving means subsequently is selectively activated to the power-on and clockwise output torque condition to reposition the load 13 by moving the shaft load in the "extend" direction. This mode involves an aiding load condition, since both the load-imposed force and the driving means 11 tend to extend the load. Prior to activating the driving means 11, the actuator 10 is in the same condition as described in connection with the second functional mode. After activation of the driving means 11 in the sixth functional mode, the cylindrical structure 32 is driven by the drive shaft 97 and drive shaft gear 100 in the counterclockwise direction. The driving means torque received by the cylindrical structure 32 is transmitted to the sleeve 49 through the plurality of interconnecting balls 62 located in the cylindrical structure and sleeve external threads 36, 54 in a manner similar to that in the other functional modes. The axial thrust force component received by the sleeve 49 from the driving means 11 acts in a direction toward the second annular member 65, thus opposing the axial thrust force imposed on the sleeve by the load 13. During the above, a rotational force component of the torque received by the sleeve 49 from the driving means 11 tends to rotate the sleeve in the counterclockwise direction, which is the same rotative direction that the load 13 tends to rotate the sleeve.

The axial thrust force received by the sleeve 49 from the driving means 11 through the cylindrical structure 32 acts in a direction which tends to move the sleeve flange 56 away from the first annular member 64 and toward the second annular member 65, thus relieving the strain of the sleeve flange against the first annular member. The rotational force components received by the sleeve 49 from the driving means 11 and the load 13 both act in the counterclockwise direction. If the load-produced forces received by the sleeve 49 are relatively large, the net axial thrust force component received by the sleeve from the load 13 and driving means 11 reduces the force holding the sleeve flange 56 against the first annular member 64 enough to permit slippage between the sleeve flange and first annular member. As in the third functional mode, the driving means 11 merely releases the brakes of the braking-coupling actuator and the outside forces acting on the load actually reposition the load 13. During this repositioning effected by a relatively large aiding load, the sleeve flange first face 57 continually slips against the first annular member 64; and, since the cylindrical structure 32 and sleeve 49 are locked together at their interconnecting balls 62, the cylindrical structure and sleeve rotate together about their common axis 15. When the sleeve 49 rotates, it transmits a rotational force (which acts in the counterclockwise direction) to the shaft 61 through the interconnecting balls 62 located in the thread-channels formed by the sleeve internal thread 55 and the shaft thread 60. The wedging action of the balls 62 converts the counterclockwise rotational force transmitted to the shaft 61 into an axial thrust force which acts in the "extend" direction and a rotational force which is neutralized by the means 63 which prevents rotation of the shaft relative to the housing axis 15. The shaft 61 thus moves, in its "extend" direction, linearly through and outwardly from the housing first open end 19.

If the load-produced force received by the sleeve 49 is relatively small, the force components of the torque received by the sleeve from the driving means 11 overcomes the load-produced force holding the sleeve flange 56 against the first annular member 64 and the net axial force acts in the direction tending to move the sleeve flange toward the second annular member 65; the sleeve flange thus moves from contact with the first annular member and into contact with the second annular member. The second annular member 65 is free to rotate in the counterclockwise direction, and the second annular member, sleeve 49, and cylindrical structure 32 thus rotate as an assembly, thereby driving the shaft 61 and load 13, as explained above, linearly and in the "extend" direction of the shaft.

When the desired position of the load 13 is reached and upon the driving means 11 being deactivated to place it in its power-off condition, the torque applied by the driving means to the sleeve 49 through the cylindrical structure 32, the drive shaft 97, and gear 100 is eliminated. The sleeve 49, thus having ceased to be driven by the driving means 11 in the counterclockwise direction, has only a load-produced force imposed on it, and the load-produced force immediately tends to reverse the counterclockwise rotation of the sleeve and is prevented from doing so as will appear below.

When the driving means 11 is deactivated, therefore, the axial thrust and rotational forces received by the sleeve 49 are substantially the same as described in the second functional mode (i.e., the axial thrust force acts in the direction tending to move the sleeve toward the first annular member 64, and the rotational force acts in the counterclockwise direction) and the load 13 is precisely locked in a set position.

The braking-coupling actuator's capability of braking and locking a load is substantially unaffected by wear of the contacting surfaces of the actuator's sleeve flange 56 and the annular members 64, 65 because the relative axial movements between the sleeve flange and annular members are not limited to a specific maximum dimension. If wear increases the clearance between the sleeve flange 56 and an annular member 64, or 65, and sleeve 49 is capable of increased axial movement with respect to such annular member, and the sleeve flange is thus always capable of being promptly moved into firm contact with one of the annular members. The only adverse affect of wear on such an actuator 10 is in the introduction of a relatively small amount of looseness between the sleeve flange 56 and the annular members 64, 65 which is caused by an increase in clearance between the sleeve flange and annular members. Part of the undesired relative axial movement between the sleeve flange 56 and the annular member 64, 65 can be eliminated by tightening the second circular member bolts 85, which tightening of the bolts 85 moves the second circular member 75, forth ball thrust bearing 31, and the second annular member 65 inwardly with respect to the housing second end 20 and thus reduces the clearance between the sleeve second flange face 58 and the second annular member. The bolts 85, which are located outside the housing 17, therefore present a means for convenient, external adjustment for wear.

Since firm contact is always obtainable between the sleeve flange 56 and annular member 64, 65 the braking surfaces of the sleeve flange and annular members do not require closely controlled tolerances to obtain a reliable braking and locking capability for the braking-coupling actuator 10. Further, a maximum braking capacity, above which capacity slippage occurs, is not employed; for, unlike many existing braking-coupling actuators and by virtue of employment of a mechanical brake-releasing mechanism, the driving means torque does not have to override brakes to reposition a load. Inherent problems associated with closely controlled tolerances of coefficients of friction, such as seizure and unreliable locking occasioned by wear-induced galling on one hand or loss of locking capability accompanying wear and a consequent reduction of braking capacity on the other, are eliminated because of such tolerances are not utilized in the actuator 10.

The braking-coupling actuator 10 described herein is simple, compact, and free of the need of close manufacturing tolerances that are required of many existing braking-coupling actuators; therefore, not only is the unit cost of such an actuator lowered, but its construction reduces the probability of failure because of wear-generated contamination (i.e., the introduction of wear-generated, metallic particles into clearances between moving parts). Moreover, the lower tolerances and larger clearances between parts utilizable in the actuator of the present invention minimize the effects of large temperature changes on the various components.

Although the resilient components 87, 88 are in continuous, dragging contact with the sleeve 49, such contact is relatively light and the energy or torque received by the sleeve from the driving means 11 that is thus consumed by the friction-produced force of the resilient component is so small as to be negligible. The actuator of FIG. 2, therefore, does not excessively consume and waste input torque.

Figure 7:
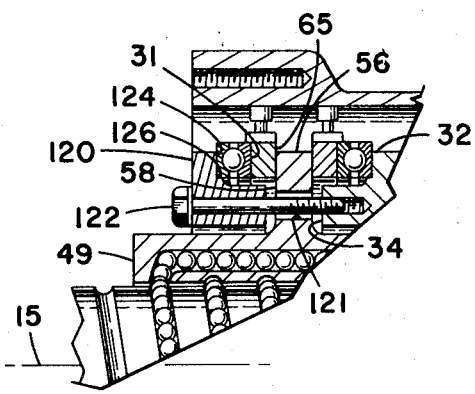
FIG. 7 is a partial, longitudinal, sectional view of a modification of the actuator of FIG. 2.

A modification of the present invention as depicted in FIG. 7, is one in which the second circular member 75 of FIG. 2 is replaced by a ring-shaped member 120, the sleeve flange 56 is provided with a plurality of holes 121, and a plurality of bolts 122 removably fasten the ring-shaped member to the cylindrical structure second end 34 through the sleeve flange holes. The ring-shaped member 120 has an outer diameter preferably approximately equal to outer diameter of the cylindrical structure 32 and an internal diameter that is approximately equal to the internal diameter of that portion of the cylindrical structure adjacent its second open end 34. A portion of the exterior surface of the ring-shaped member 120 has a reduced diameter, and the juncture of the two external diameters forms a shoulder 124. The face of the shoulder of the ring-shaped member 120 is perpendicular to the housing axis 15 when the ring-shaped member is attached to the cylindrical structure 32 by the bolts 122. The shoulder 124 has provided thereon and at its base a circular step 126 which is spaced from the reduced diameter portion of the external surface of the ring-shaped member 120 on on which is mounted the race of the fourth ball thrust bearing 31 opposite the one in contact with the second annular member 65. The circular step 126 is formed by removing as much material of the ring-shaped member 120 as necessary to permit clearance of the race of the fourth ball thrust bearing 31 that is in contact with the second annular member 65 and is perpendicular to the shoulder 124. The ring-shaped member shoulder 124 is in contact with the race of the fourth ball thrust bearing 31 that rests on the ring-shaped member circular step 126.

The axial position of the ring-shaped 120 is adjusted by the bolts 122 to bring the second annular member 65 into relatively light dragging contact with the sleeve flange second face 58. As before described, clearance between the second annular member 65 and sleeve flange 56 is readily effected by tightening or loosening the ring-shaped member bolts 122. If desired, an annular dust or lubricant seal (not shown) could be provided and mounted in a manner similar to the mounting of the second circular member 75 as shown in FIG. 2.

In operation, the braking-coupling actuator of FIG. 7 functions in substantially the same manner as the above-described actuator of FIG 2. Rotational movement of the ring-shaped member 120 and the cylindrical structure 32 relative to the sleeve 49 is relatively small, and the sleeve flange holes 121 are sized larger than the ring-shaped member bolts 122 passing through them to permit such relative rotational movement.

What is claimed is:

1. An actuator for connecting a reversible, rotary driving means to a load to be linearly moved and positioned thereby relative to a fixed structure, said actuator comprising:
    a housing having first and second open ends, a longitudinal axis transfixing the ends, a wall rigidly connecting the ends in a fixed relation to each other, a first passageway laterally penetrating the wall, and means for pivotally mounting the housing on said fixed structure;
    a generally cylindrical structure having first and second open ends, a longitudinal axis coincident with the housing axis, a second passageway extending through the cylindrical structural and coaxial therewith, and an internal thread, the cylindrical structure being provided with means for drivingly connecting it to the rotary driving means, said means for drivingly connecting having extension through the housing first passageway;
    a cylindrical sleeve coaxial with the housing and having a longitudinal axis and first and second end portions each provided with a thread, the sleeve first end portion thread being external and matching the cylindrical structure internal thread and the sleeve second end portion being internal and of a direction opposite to the direction of the sleeve first end portion thread, the sleeve second end portion having a flange rigidly mounted on the exterior thereof, said flange having first and second, parallel faces which are perpendicular to the sleeve axis, and each of the sleeve end portions having an end face;
    a cylindrical shaft extending through a coaxial with the sleeve and having a longitudinal axis and a thread matching the sleeve second end portion internal thread, the shaft being provided with means for drivingly connecting it to a load and for preventing the shaft from rotating about its axis;
    a plurality of balls mounted within all the above-mentioned threads and in connecting relation between the shaft and sleeve and between the sleeve and the cylindrical structure;
    first and second annular members each having a side face confronting a respective one of the sleeve flange faces;
    means coaxially mounting the cylindrical structure and annular members within the housing for rotation about the housing longitudinal axis and preventing translation of the cylindrical structure and annular members relative to the housing; and
    means preventing rotation of one of the annular members in a first direction and of the other annular member in a second direction about the housing axis.

2. The actuator claimed in claim 1, said means for preventing rotation of one of the annular members in a first direction and of the other annular member in a second direction about the housing axis comprising a pair of ratchets.

3. The actuator of claim 1, there being provided within the sleeve second end portion a passageway which connects the ends of the sleeve internal thread, thereby providing, in cooperation with the sleeve internal thread and shaft thread, a closed loop for continuous circulation of the balls within the sleeve internal thread; and
    first and second recesses provided in the cylindrical structure, the first recess being provided at one end of the cylindrical structure internal thread and the second recess provided at the other end of the cylindrical structure thread, each recess having a diameter larger than the diameter of the balls, the recesses providing extensions of the cylindrical structure and external sleeve threads to enable the balls to roll along the threads.

4. The actuator of claim 3, each of said threads being substantially filled with ones of said balls and said cylindrical structure recesses having means for urging balls from the recesses and into the cylindrical structure threads.

5. The actuator of claim 1, said means coaxially mounting the cylindrical structure and annular members within the housing for rotation about the housing longitudinal axis and preventing translation of the cylindrical structure and annular members relative to the housing comprising:
    an internal flange on the housing and having a face perpendicular to the housing axis and facing toward the housing first open end;
    a shoulder externally located on the cylindrical structure and having a face which faces toward the housing second open end;
    first and second flanges externally located on the cylindrical structure and each having a face perpendicular to the cylindrical structure axis, the first-flange face facing toward the housing first open end and the second-flange face facing toward the housing second open end;
    first and second circular members each having a face and a centrally located aperture therethrough, each of the circular members being removably attached to a respective housing open end and being positioned with its face facing inward with respect to the housing; and
    a plurality of thrust bearings, one of the thrust bearings being positioned between and in contact with the housing internal flange face and the cylindrical structure second-flange face, another of the thrust bearings being positioned between and in contact with the cylindrical structure first-flange face and the face of the circular member attached to the housing first open end, another of the thrust bearings being postiioned between and in contact with the first annular member and the face of the cylindrical structure shoulder, and yet another of the thrust bearings being positioned between and in contact with the second annular member and the face of the circular member attached to the housing second open end.

6. The actuator of claim 5, said actuator being provided with means for applying a dragging force to the sleeve for opposing rotary movement of the sleeve relative to the housing.

7. The actuator of claim 6, said means for providing a dragging force to the sleeve comprising at least one annular resilient component positioned around one end of the sleeve and removably attached to at least one of the circular members.

8. The actuator of claim 1, said sleeve flange having a plurality of holes and said means coaxially mounting the cylindrical structure and annular members within the housing for rotation about the housing longitudinal axis and preventing translation of the cylindrical structure and annular members relative to the housing comprising:
    an internal flange on the housing and having a face perpendicular to the housing axis and facing toward the housing first open end;
    a shoulder externally located on the cylindrical structure and having a face which faces toward the housing second open end;
    first and second flanges externally located on the cylindrical structure and each having a face perpendicular to the cylindrical structure axis, the first-flange face facing toward the housing first open end and the second-flange face facing toward the housing second open end;

a circular member having a face and a centrally located aperture theretrhough, the circular member being removably attached to the housing first open end and positioned with its face facing inwardly with respect to the housing;

a ring-shaped member removably attached to the cylindrical structure by a plurality of bolts passing through the sleeve flange holes and having a face facing the cylindrical structure second end; and a plurality of thrust bearings, one of the bearing being positioned between and in contact with the housing internal flange face and the cylindrical structure second-flange face, another of the thrust bearings being positioned between and in contact with the cylindrical structure first-flange face and the circular member face, another of the thrust bearings being positioned between and in contact, with the first annular member and the face of the cylindrical structure shoulder, and yet another of the thrust bearings being positioned between and in contact with the second annular member and the face of the ring-shaped member.

9. The actuator of claim 1, said means for drivingly connecting the cylindrical structure to the rotary driving means comprising:

a set of gear teeth formed in the cylindrical structure and encircling the cylindrical structure axis;

a drive shaft having first and second ends and rotatably mounted within the housing first passageway, the drive shaft second end being provided with means for drivingly connecting it to a rotary driving means; and a gear rigidly mounted on the drive shaft first end and in engagement with the gear teeth of the cylindrical structure.

10. The actuator of claim 1, the means for pivotally mounting the housing comprising two coaxial, mutually spaced trunnions on the exterior of the housing, said trunnions having axes mutually perpendicular to a plane containing the housing axis.

11. The actuator of claim 10, the trunnion axes being coincident with each other, the first passageway laterally penetrating the housing wall being provided through one of said trunnions, a similar passageway being provided through the other trunnion.

* * * * *